Jan. 23, 1945.   T. W. FLYNN   2,367,858
ILLUMINATED INSTRUMENT
Filed Sept. 22, 1942
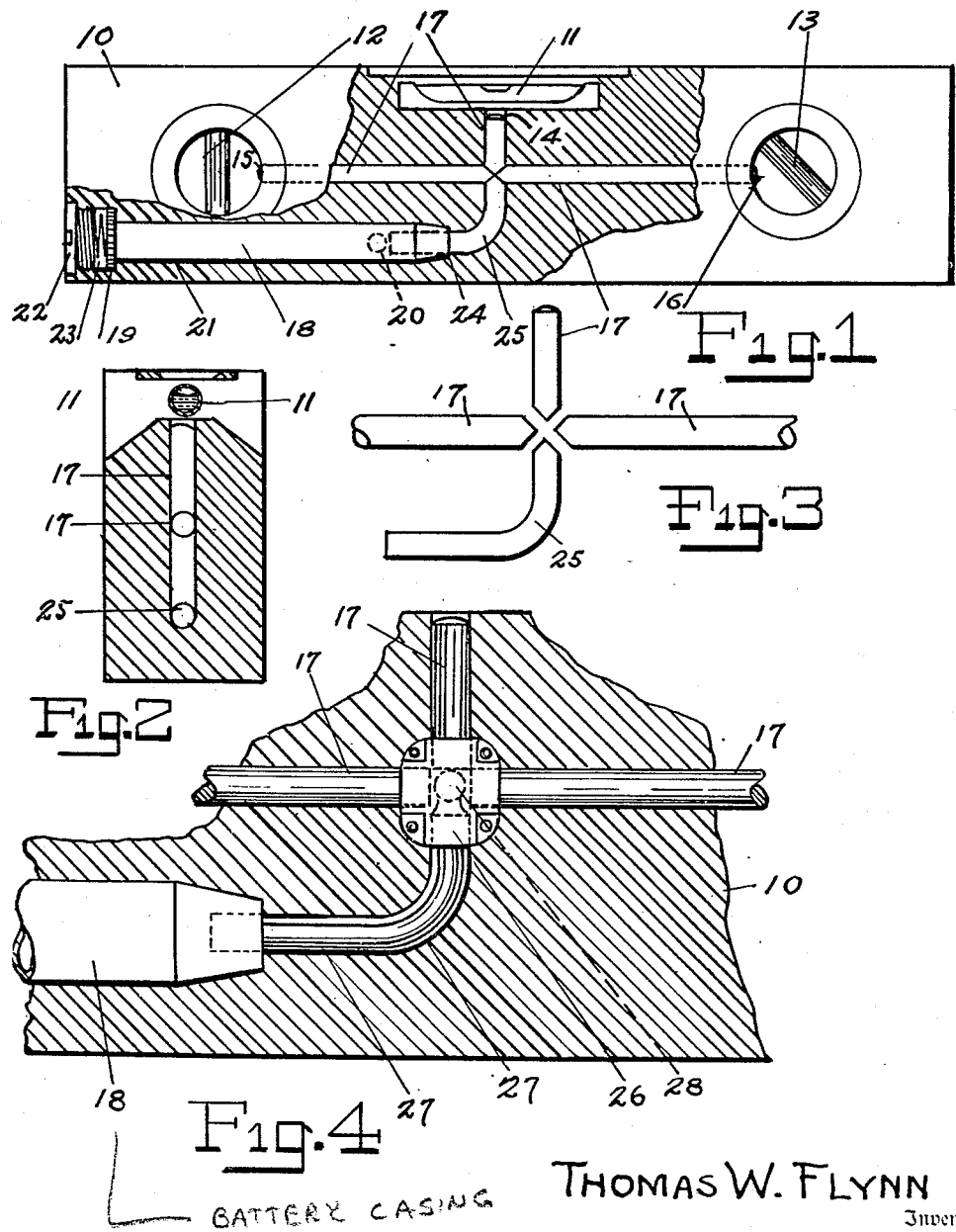
Thomas W. Flynn
Inventor
Herbert E. Smith
Attorney Patented Jan. 23, 1945

2,367,858

UNITED STATES PATENT OFFICE 2,367,858

ILLUMINATED INSTRUMENT

Thomas W. Flynn, Bayview, Idaho, assignor of fifteen per cent to Hillard O. Arneson and fifteen per cent to Harold Stalin, both of Bayview, Idaho Application September 22, 1942, Serial No. 459,334

1 Claim. (Cl. 240—6.44)

My invention relates to improvements in illuminated instruments and especially to that type of instrument that is carried around and used in isolated or remote places and in which the light source is accomplished through the use of batteries which may be incorporated into the instrument or be mounted closely adjacent thereto.

In the adaptation of my invention I prefer to use Lucite rods or sticks which are a form of plastic having the properties of permitting the rays from a light source to travel axially through the rod and through which little light is emitted other than at the extreme end of said rod or stick. Such a rod is capable of being formed or bent under proper treatment around corners and may be so arranged in connection with an instrument in which it is incorporated that obstructions may be avoided or circumvented and the light source still be permitted to be expended at the end of the rod, which is directed upon an object such as a gauge, a pointer or bubble as in the case of spirit levels.

While my invention is applicable to a multitude of uses in connection with the illumination of instruments frequently used in dark corners, in basements or other places poorly illuminated, and has many other useful purposes in a like manner, I shall describe the details and use thereof as though the device were installed in a spirit level of the type used by mechanics, which may include carpenters, plumbers, steam fitters, etc., but I do not wish to be limited thereto in the scope of my invention.

It is an important object of my invention to provide an improved means for furnishing illumination to be incorporated within an instrument, that is of simple construction, is durable in use and positive in action at all times.

Another object of the invention is to install within an instrument or its casing, a source of light controllable by the user in which the light may be transmitted in various and tortuous ways to play upon some particular scale or feature of the instrument which shall serve as a means of reading said scale or instrument regardless of any obstructions normally interfering with direct and straight line passage of light rays from the light source to the field desired for illumination.

Another object of my invention is the provision for connecting several Lucite rods, having a common light source, and a multiple number of light carrying rods to illuminate a multiple number of fields, instruments or gauges.

Other objects and advantages of the invention will be apparent from a study of the annexed drawing and during the course of the following description wherein I have shown and described a preferred form of my invention as applied to a spirit level. In the drawing forming a part of this specification, like reference numerals refer to like parts throughout the same.

Figure 1 is an elevational view, partly in cross section of a so-called hand or spirit level commonly used by mechanics in construction work and various other installations usually connected with construction projects.

Figure 2 is a cross section taken on the line 2—2 of Figure 1.

Figure 3 is a view showing branch Lucite members ready for joining and assembly in a spirit level in which the branches carry light through the rods to the various instruments incorporated in the level.

Figure 4 is an alternative method of joining a multiple number of Lucite rods and showing a light source incorporated therewith.

Referring to Figure 1, the numeral 10 designates a frame for a level into which is mounted the horizontal spirit capsule 11, the vertical spirit capsule 12, and the 45 degree capsule 13, and closely adjacent to the several devices are the terminal ends 14, 15 and 16 of the Lucite tubes 17, which carry the light rays from a light source.

Mounted within the frame end of the level is a power source of light comprising a light pencil 18, which consists of a casing, one or more batteries, a lamp and a means for controlling the lamp, such as a switch which in the present illustration comprises the round end knurled cap 19 secured to the battery casing and which can be turned or rotated through a slot (not shown in the drawing) in the frame structure 10 to turn on or off the light located in the opposite end at 20 within the casing 18. Such a power source is commonly termed a flash light pencil and in the present case I place a bore as 21 at some convenient point in the level frame 10 so that the light pencil may be inserted and so that it may be held in place through the use of a cap member 22 and a spring 23 to urge the pencil casing into its formed chamber 21. Such pencils as illustrated at 18 are provided with a terminal end or a bushing 24 to receive the Lucite rod 25 of the proper diameter. Connected at one end to the stick or rod which is bent at right angles are the branch sticks or rods 17 leading to the several instruments incorporated into the level frame.

Various ways and means of installing the Lucite rods may be resorted to. The level frame 10 may be split longitudinally of its center, the illumination means inserted in preformed grooves therein and the two halves joined together, as one example of maintaining the Lucite members in their distinct relationship to the instruments and to the light source.

In Figure 3 is disclosed the four unit members comprising the light carrying rod 25 from the source of illumination, the several branches 17 which may be mitered and welded together to form a single unitary formation ready for easy and simple intallation in such instruments as herein illustrated. The drawing here may be considered an installation of the device of my invention in a mechanic's wooden level.

Other levels for the same purpose sometimes called the skeleton frame type are made entirely of metal in which as much metal as possible is eliminated to lighten the instrument. In such constructions the Lucite may be so formed that it can be readily installed and even if exposed will function in the manner desirable for such uses as the level may be put to, especially in dark places such as basements, under houses or other construction enterprises.

Referring to Figure 4 an alternative method of applying the light source has been illustrated in which the Lucite rods 17 are mounted in a holder or support 26 and which holder also engages a hollow conduit 27 which is held into the flash light casing 12 and in which wires in the conduit 27 carry to the opposite end of the conduit where is mounted a lamp socket supporting a lamp 29 which when turned on will emit rays that will pass into and longitudinally along the several Lucite branch rods to their ends which are focused to illuminate the bubble or bubbles in the spirit level when the level is held in the proper position to bring these bubbles in register within the range of the illumination provided.

Other and various forms of construction and installation of the device for direct illumination upon various units of the above described instrument and of various other instruments may be resorted to. The chief features of importance in the invention reside in the fact that the light source may be remote from the point of illumination and that through the use of Lucite rods which are capable of being bent in various shapes and forms they are adapted to be adjusted in position and to be arranged to avoid obstructions or other difficulties that the desired aims and objects may be reached with a minimum of cost, and a multitude of instruments or objects may be so illuminated from a common source and in an extremely simple manner.

I claim:

In a spirit level, a base member having three externally visible bubble glasses, a light transmitter bar in said base member extending from each bubble glass to a common point within the base, each said bar having a point of light radiation adjacent its associated bubble glass, a light pencil in said base member remote from said common point, and a light conductor bar from said light pencil to said common point, the ends of the several light transmitter bars and the conductor bar each having a 90 degree taper and being joined in a miter joint whereby light rays radiating from the conductor bar between the pencil and the common point pass into and along the transmitter bars to the various bubble glasses.

THOMAS W. FLYNN.